United States Patent [19]
Nogami

[11] Patent Number: 5,975,790
[45] Date of Patent: Nov. 2, 1999

[54] CLAMP FOR CONNECTING FORMWORK PANELS TOGETHER

[76] Inventor: Shinichi Nogami, 3-5, Fukanokita 1-chome, Daito-shi, Osaka, Japan

[21] Appl. No.: 08/867,862

[22] Filed: Jun. 3, 1997

[30] Foreign Application Priority Data

Feb. 24, 1997 [JP] Japan ..................................... 9-038879

[51] Int. Cl.⁶ .................................................... B25G 3/36
[52] U.S. Cl. ........................... 403/403; 269/41; 403/385; 403/384
[58] Field of Search ..................................... 403/385, 384, 403/403, DIG. 9, 338, 401, 402, 231, 396, 362; 52/699; 269/41; 249/219.2, 219.1

[56] References Cited

U.S. PATENT DOCUMENTS

| | | | |
|---|---|---|---|
| 1,783,456 | 7/1930 | Wilson . | |
| 3,771,757 | 11/1973 | Black . | |
| 4,236,703 | 12/1980 | Stevenson | 269/41 |
| 4,673,174 | 6/1987 | Tabbert | 269/41 |

*Primary Examiner*—Lynne A. Reichard
*Assistant Examiner*—David E. Bochna
*Attorney, Agent, or Firm*—Lowe Hauptman Gopstein Gilman & Berner

[57] ABSTRACT

A clamp 100A for connecting formwork panels 50, 50 together at a right angle has a symmetrical shape and comprises a generally triangular central section 1, one intermediate lever 3 connected pivotally to each of opposed sides of the central section 1, and an L-shaped holding arm 2 connected to the intermediate lever 3 by means of a link 4 that is pivotally joined with both the intermediate lever 3 and the holding arm 2. The central section 1 has two equal sides a, a which extend perpendicular to each other and at which the central section 1 engages with joint members 52, 52 of formwork panels 50, 50. Notches 1c are formed on each side a, and are adapted to bite into one joint member 52. Each side a of the central section 1 is thus capable of engaging very closely with the joint member 52. The holding arm 2 is also provided with notches 2c, so that the holding arm 2 also can engage very closely with the joint member 52.

11 Claims, 8 Drawing Sheets

CLAMP FOR CONNECTING FORMWORK PANELS TOGETHER

FIELD OF THE INVENTION

This invention relates to a device for connecting formwork panels together.

BACKGROUND OF THE INVENTION

Mixed concrete must be placed in a form. A form also often is called a formwork or shuttering. FIG. 2 illustrates a portion of a formwork to produce a square portion of a desired concrete structure. Reference numeral 50 designates a formwork panel that comprises a wood board 51 and a pair of elongated joint members 52 of wood fixed to opposed sides of the board 51 by a suitable method such as nailing. The formwork's square portion of FIG. 2 thus comprises four panels 50. The four panels are also designated by reference numerals P1, P2, P3, and P4, respectively. A first panel P1 and a second panel P2 are connected together with two clamps 100A of this invention. The second panel P2 and a third panel P3 are also similarly connected together with two clamps 100A of this invention. The first panel P1 and a fourth panel P4, however, are connected not by use of clamps of the invention but by nailing a portion 51a of the wood board 51 of the first panel P1 that projects from the wood board 51 of the fourth panel P4, to one of the joint members 52 of the fourth panel P4. This method of connecting the first and fourth panels P1 and P4 is a conventional method employed widely in the prior art, and is much more clearly shown in FIG. 11. The third and fourth panels P3 and P4 are connected together by the same conventional method.

It will be appreciated, however, that all the panels P1 to P4 of FIG. 2 in fact can be connected together either solely by use of the clamps 100A of this invention or solely by the conventional method, although the two methods produce different volumes. As a matter of fact, the formwork's square portion of FIG. 2 is deliberately illustrated as being assembled partly (i.e., at too corners thereof) according to the invention and partly (i.e., at its other two corners) by the conventional method, for the sake of presenting very clearly a difference between the prior art and this invention.

In FIG. 11, reference numeral 60 designates mixed concrete and reference numeral 53 a piece of wood used to chamfer the concrete 60.

Another conventional method (not shown) for connecting formwork panels together at right angles is by nailing together adjacent joint members of adjacent panels.

The conventional technique of nailing formwork panels together to join them, however, has the following drawbacks:

(a) It takes much time and trouble to nail formwork panels together.
(b) The nails can be removed to separate and reuse the panels, but removing the nails takes more time and trouble.
(c) The more often formwork panels are nailed and separated, the sooner they are seriously damaged and, hence, the shorter period of time they only last.
(d) The conventional technique of connecting formwork panels together at right angles, therefore, not only is uneconomical but also conflicts with the spirit of forest conservation.
(e) Damaged formwork panels can be repaired, but to do so naturally involves costs.
(f) Nailing formwork panels together firmly enough requires considerable skill.
(g) Using nails involves a potential danger to the human body.

SUMMARY OF THE INVENTION

Accordingly, it is an object of the invention to provide a method for connecting formwork panels together at right angles without using nails.

Another object of the invention is to provide a device for connecting formwork panels together at right angles to assemble a square formwork or a square portion of a formwork.

A still another object of the invention is to provide such a device which enables one to very readily connect formwork panels together at right angles and to separate them very readily after use.

A further object of the invention is to provide such a device whereby one can avoid causing serious damage to formwork panels or doing damage to his own body when connecting them together at right angles, as well as when separating them.

A still further object of the invention is to provide such a device that allows one to use formwork panels repeatedly for a relatively long period of time.

Another object of the invention is to provide a device for connecting formwork panels together at an angle somewhere in the vicinity of 90 degrees.

Still another object of the invention is to provide a device for connecting formwork panels to form a straight portion of a formwork.

Other objects and advantages of the invention will become apparent from the detailed description of the invention that will follow.

BRIEF DESCRIPTION OF THE DRAWINGS

FIG. 8 depicts an instant of a joint member 52 of a formwork panel 50 being held almost completely by the clamp, and in FIG. 9 that joint member 52 has been held completely by the clamp.

FIG. 14 shows an instant of joint members 52, 52 of two adjacent formwork panels 50, 50 being held together almost completely by the clamp 100B, and in FIG. 15 those joint members 52, 52 have been held completely by the clamp 100B with the result that a straight portion of a formwork is completed.

DETAILED DESCRIPTION OF PREFERRED EMBODIMENTS

Figure 1:
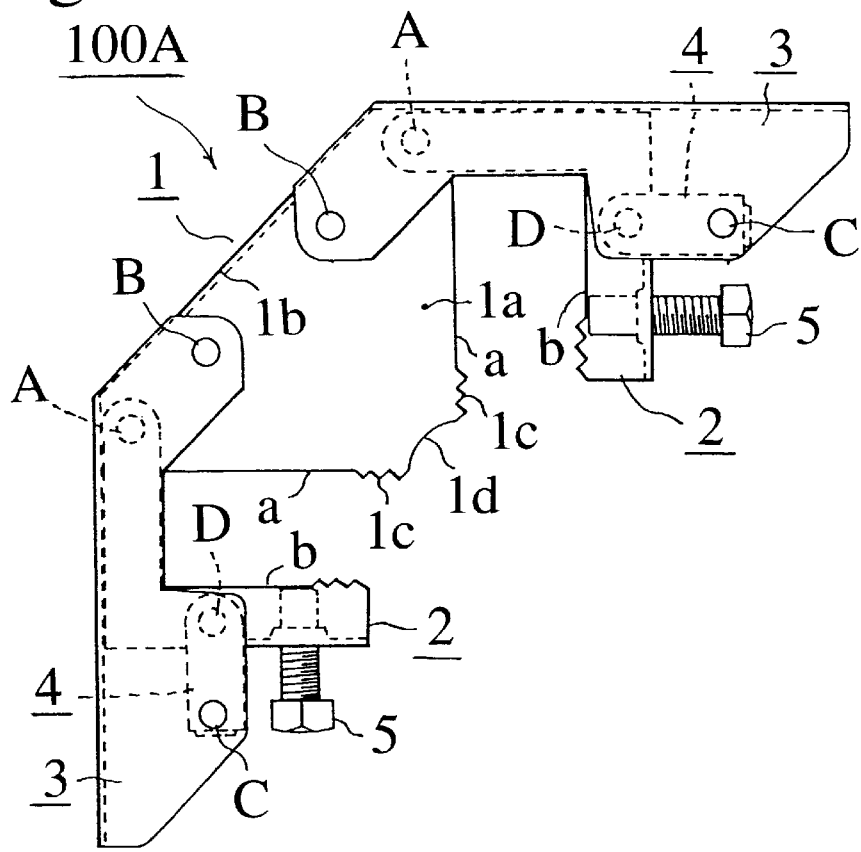
FIG. 1 is a plan view of a clamp 100A of the invention.
Figure 7:
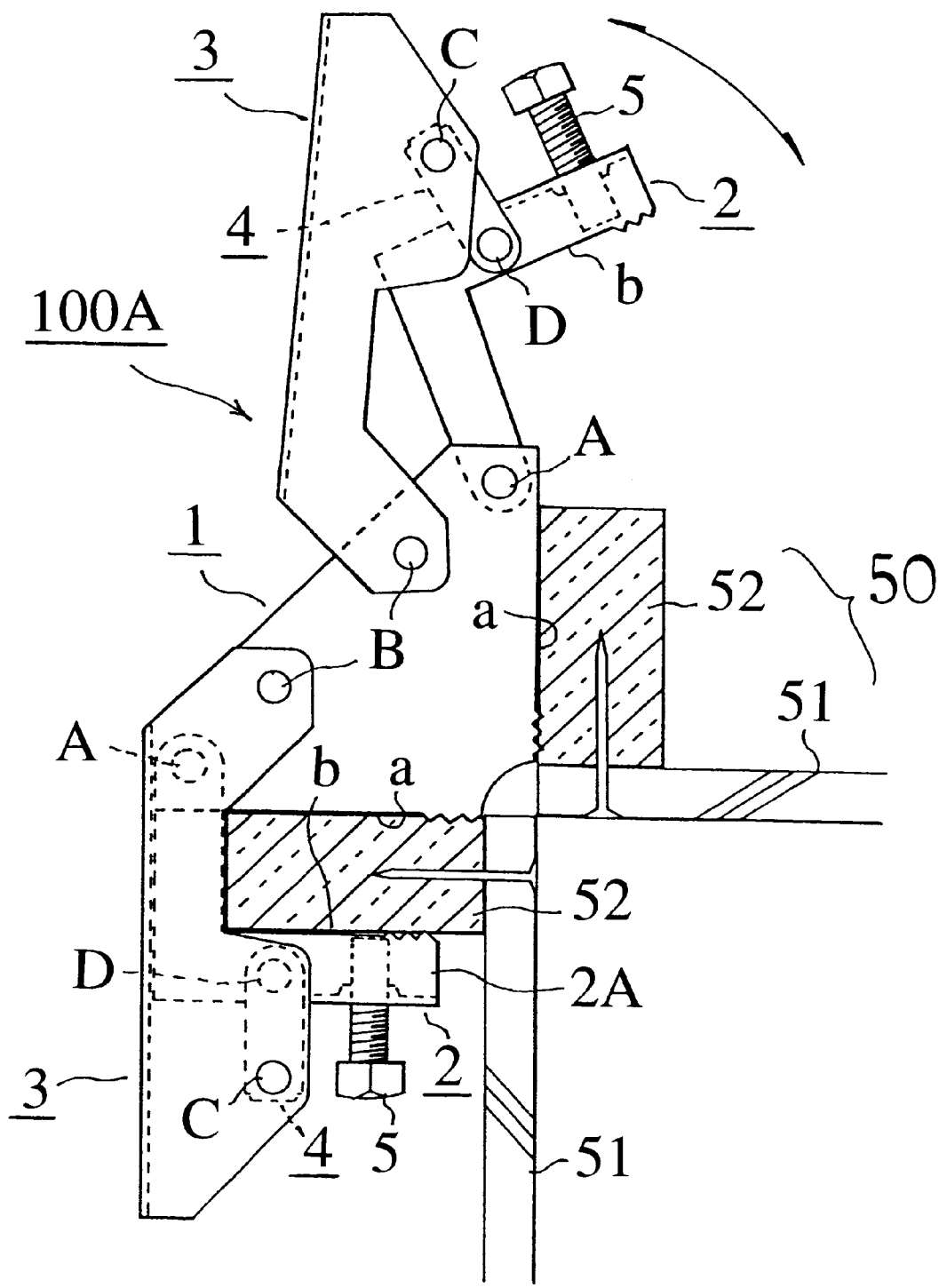
FIG. 7 shows two formwork panels 50, 50 being connected together at a right angle with the clamp 100A of FIG. 1.
Figure 8:
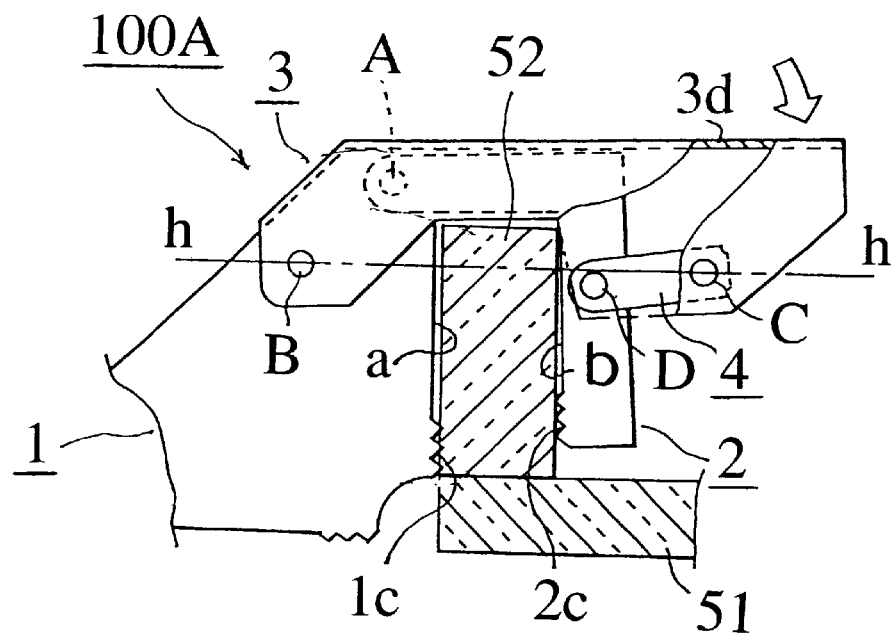
FIGS. 8 and 9 illustrate two successive points of time. That is.

A connecting device, or clamp, 100A of the invention will now be described in detail, referring to FIGS. 1 to 9. Referring to FIGS. 1 and 7 in particular, the clamp 100A includes a generally triangular central section 1. Not only does the clamp 100A have a symmetrical shape as clearly illustrated, but also constructions on both sides of the center of the central section 1 are identical and, accordingly, the construction on one side only will be described. An intermediate lever 3 is connected to the central section 1 by a pivotal pin B. An L-shaped holding arm 2 is also connected to the central section 1 by a pivotal pin A. The holding arm 2 and intermediate lever 3 are connected together by a link 4. The link 4 is joined with the intermediate lever 3 and holding arm 2 by means of pivotal pins C and D, respectively.

Figure 3:
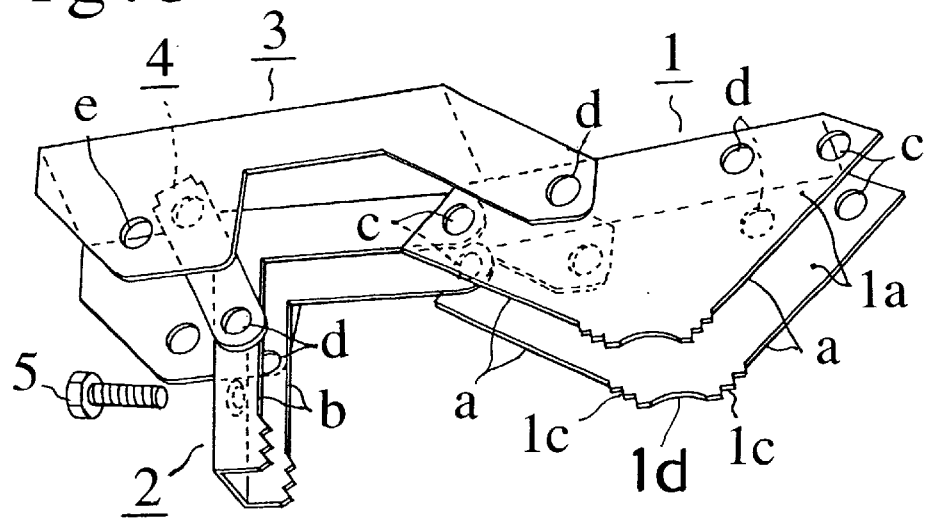
FIG. 3 is an exploded view of the clamp 100A of FIG. 1.

As illustrated in FIG. 3, the central section 1 is shaped like a channel in its cross section, and has two opposed wall members 1a, 1a. The wall members 1a, 1a have identical shapes of an isosceles triangle that is cut away at its three corners. In particular, each wall member 1a has a recess 1d. The two equal sides a, a of each wall member are formed perpendicular to each other. Two outer openings c, c are made in each wall member 1a for receiving the pivotal pins, A, A. Similarly, two inner openings d, d are made in each wall member 1a for receiving the pivotal pins B, B. Notches 1c are formed by the side of the recess 1d. Other notches 1c are also formed on the other side of the recess 1d.

Figure 4:
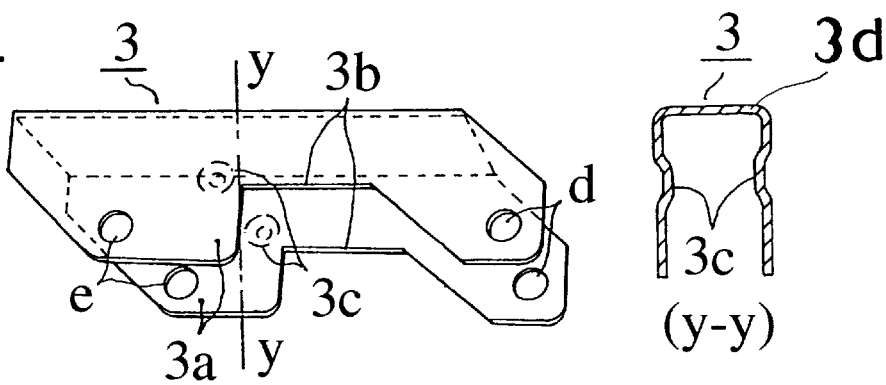
FIG. 4 is a perspective view of an intermediate lever 3 of the clamp 100A of FIG. 1 and a cross section of the intermediate lever taken on line y—y of that perspective view.

As shown in FIG. 4, the intermediate lever 3 has opposed side walls 3a, 3a, and is also shaped like a channel in its cross section. The side walls 3a, 3a have such a distance between them that the intermediate lever 3 slides on the central section 1 on the outside of the central section 1. Two openings d and e are made in each side wall 3a for receiving the pivotal pins B and C, respectively. Also, each side wall 3a is recessed at 3b to accommodate a joint member 52 of a formwork panel 50. In addition, each side wall 3a is recessed at 3c, and the intermediate lever 3 engages frictionally with the holding arm 2 at these recessed portions 3c, 3c.

Figure 5:
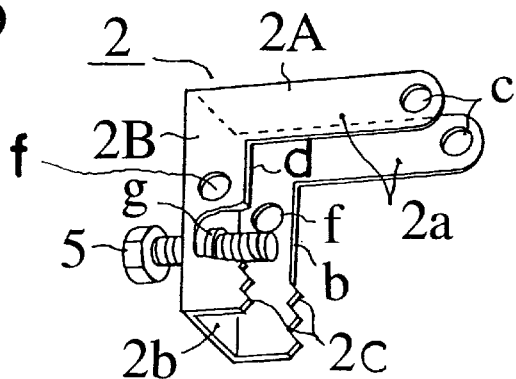
FIG. 5 shows a holding arm 2 of the clamp 100A of FIG. 1.
Figure 6:
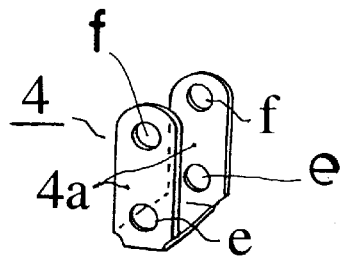
FIG. 6 shows a link 4 of the clamp 100A.

As illustrated in FIG. 5, the holding arm 2 has opposed L-shaped side walls 2a, 2a. One straight portion 2B of the holding arm 2 comprises the two side walls 2a, 2a and a rear wall 2b and, thus, has the shape of a channel in its cross section, while the other straight portion 2A thereof, perpendicular to the straight portion 2B, is composed only of the side walls 2a, 2a. As best shown in FIG. 7, the holding arm 2 has one end disposed inside the central section 1 and connected to the same section 1 by means of the pivotal pin A. As shown in FIG. 5, an opening c is made in each side wall 2a for receiving the pivotal pin A. Also, an opening f is made in each side wall 2a for receiving the pivotal pin D that connects the holding arm 2 and link 4 together. Reference numeral b designates an edge of the straight portion 2B to engage with a joint member 52 of a formwork panel 50. Notches 2c are formed on this edge b. An opening g is made in the rear wall 2b. A bolt 5 is inserted through this opening g.

As described above, the holding arm 2 and intermediate lever 3 are connected together by means of the link 4. The link 4 has a simple shape of FIG. 6. Reference numeral 4a designates two opposed walls. An opening f is made in each wall 4a for receiving the pivotal pin D, and another opening e is also made in each wall 4a for receiving the pivotal pin C. The two walls 4a, 4a have such a distance between them that the link 4 may slide on the holding arm 2 on the outside of the holding arm 2.

Figure 2:
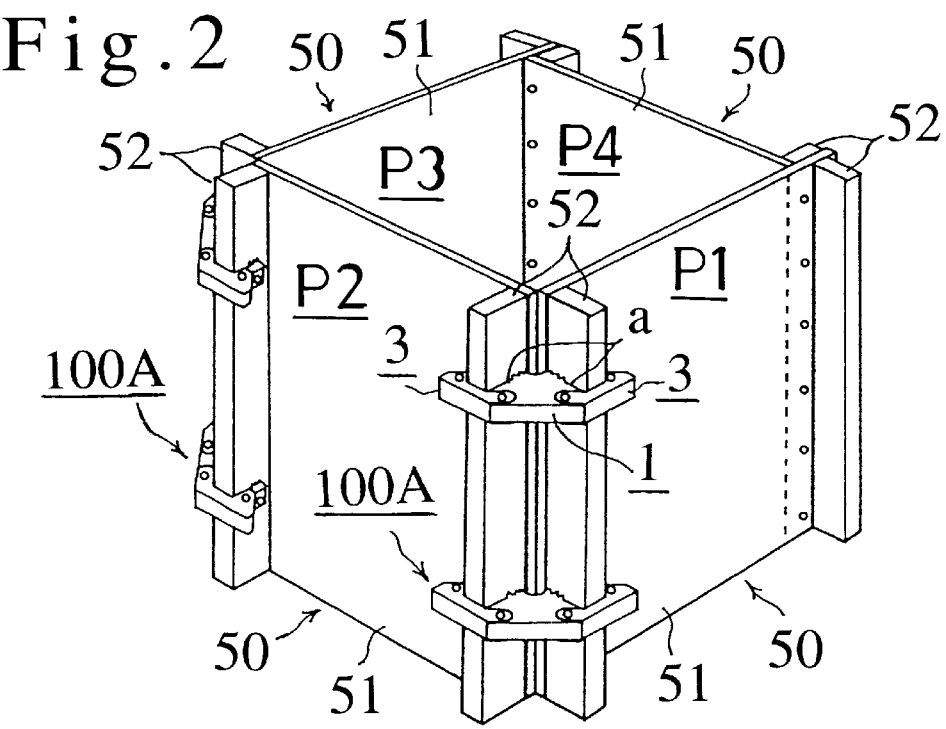
FIG. 2 shows a square portion of a formwork as assembled according to the invention hereof at two corners thereof and by a conventional method at its remaining two corners.
Figure 9:
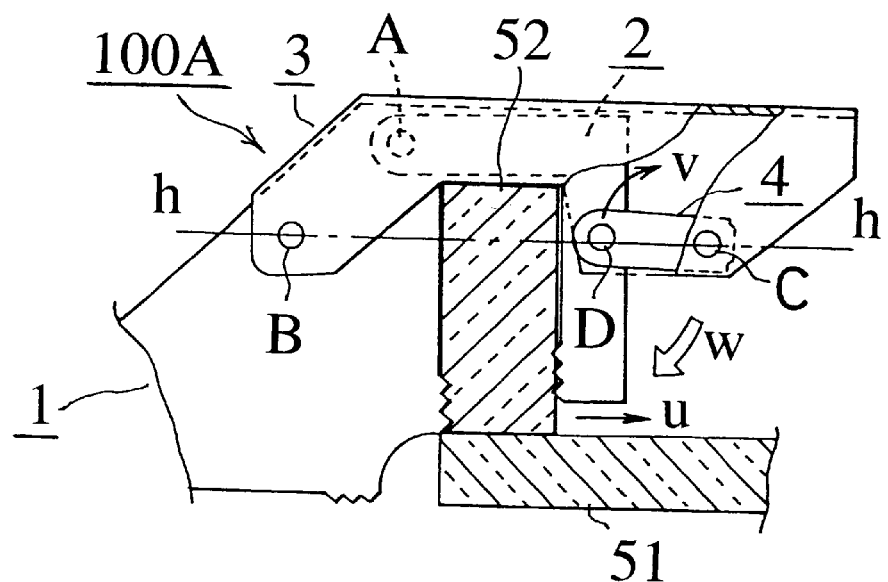

Two formwork panels 50, 50 positioned at a right angle to each other as shown in FIG. 2 or 7 can be joined together with the clamp 100A, as follows, without changing the position of each panel 50 relative to the other panel 50. In FIG. 7 one joint member 52 is nailed to each board 51. First, the clamp 100A is brought close to the joint members 52, 52. Then, as shown in FIG. 7, each intermediate lever 3 is turned away from the joint member 52. This will turn the holding arm 2 in the same direction at the same time. Then, the central section 1 of the clamp 100A is brought into contact with the joint members 52, 52. To be more exact, two edges a of the central section 1 extending in the same direction (FIG. 3) are brought into contact with one joint member 52, and the remaining two edges a thereof extending perpendicular to those edges (FIG. 3) are brought into contact with the other joint member 52. Then, the intermediate lever 3 is turned back toward the joint member 52 until the notches 1c of the central section 1, as well as the notches 2c of the holding arm 2, have bitten into the joint member 52, as illustrated in FIG. 9. In the condition of FIG. 9 the joint member 52 is held completely by the central section 1, intermediate lever 3, and holding arm 2.

Then, another clamp 100A, may be similarly applied to the same joint members 52, 52 at a different position (FIG. 2). The formwork panels 51, 51 can be thus firmly and very readily connected together at a right angle.

FIG. 1 shows a point of time immediately before the point of time of FIG. 9. At this point of time of FIG. 8, the notches 1c and 2c are in contact with the joint member 52 but still do not bite into it. Also, at the point of time of FIG. 8, the pin D is positioned below a line h—h connecting the pins B and C. At this point of time, however, the holding arm 2 is pressed by a section 3d (FIG. 4) of the intermediate lever 3 that forms the bottom of the channel shape of the lever 3. Thus one can press the intermediate lever 3 further against the joint member 52 to make the notches 1c and 2c bite into the joint member 52. After the notches 1c and 2c have bitten into it, the pin D is almost above the line h—h, as shown in FIG. 9.

When the clamp 100A is being applied to the formwork panels or after it has been applied thereto, a force may be accidentally exerted on the holding arm 2 in a direction u of FIG. 9. In such a case, a force is produced that would turn the link 4 in a direction v (FIG. 9), but this turning force produces an opposing force in the intermediate lever 3 that forces the lever 3 in a direction w. Thus, in such a case, the holding arm 2 is certainly prevented from disengaging from the joint member 52.

After the formwork has been used, the intermediate lever 3 can be forced away from the joint member 52 to separate the panels 50, 50.

Figure 10:
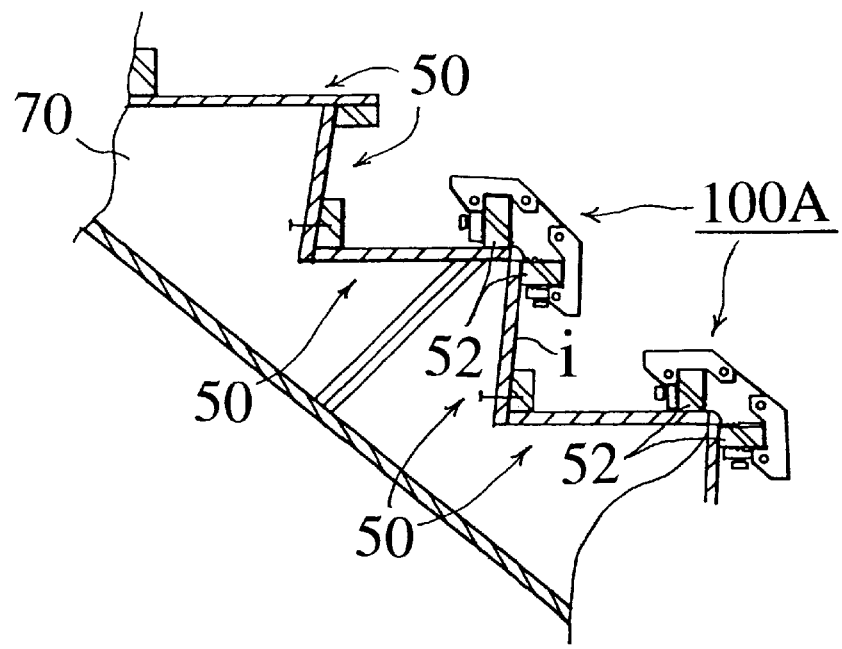
FIG. 10 shows the clamps of the invention being used to assemble a formwork for constructing a stairway of concrete.
Figure 11:
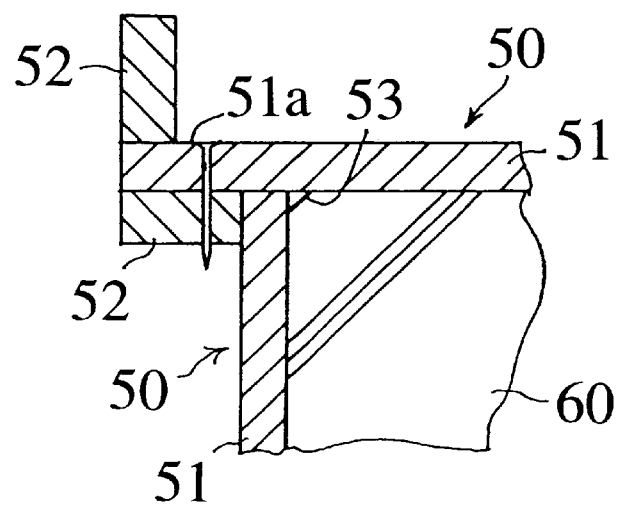
FIG. 11 shows prior art.

FIG. 10 illustrates that the clamp 100A of the invention also can be used to connect two formwork panels together at an almost, not exactly, right angle. That is, in FIG. 10, the clamp 100A is being used to connect two formwork panels 50, one being employed to form a tread of a stairway of concrete and the other to form a riser thereof, at an acute angle. It can be seen that the tread is going to be formed in an exactly horizontal plane while a slightly inclined riser is going to be formed. In order to connect formwork panels together at such an angle with the clamp 100A, however, one should use joint members 52 with a relatively small thickness. Also, for the same purpose, one has to engage the bolts 5, 5 with the joint members 52, 52 as a last step for clamping the formwork panels. To connect formwork panels together at an exactly right angle with the clamp 100A does not require using the bolts 5.

Method of connecting formwork panels together at an approximately right angle without using the bolts 5 is by using a central section (1) with two equal sides (a, a) making the angle with each other that, combined with the approximately right angle between the formwork panels, gives a total of 360 degrees.

Figure 12:
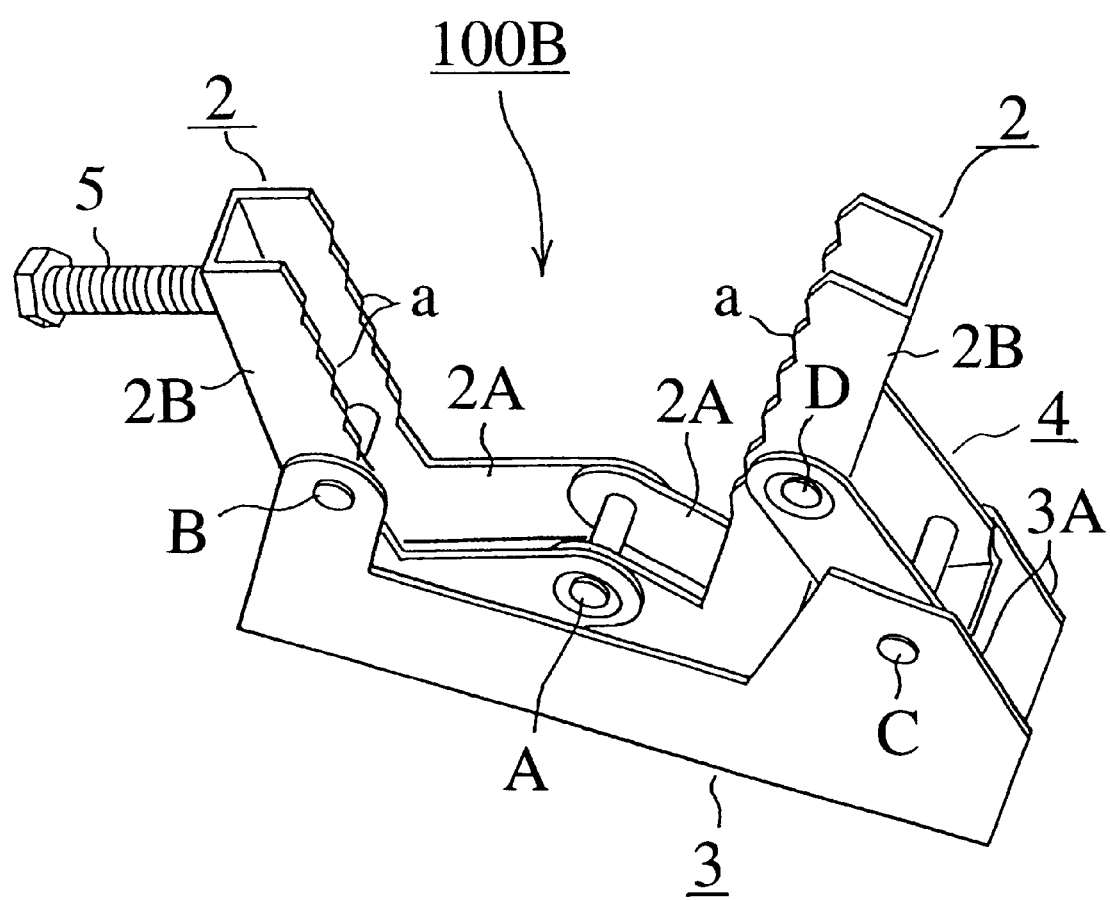
FIG. 12 shows another clamp 100B of the invention.
Figure 13:
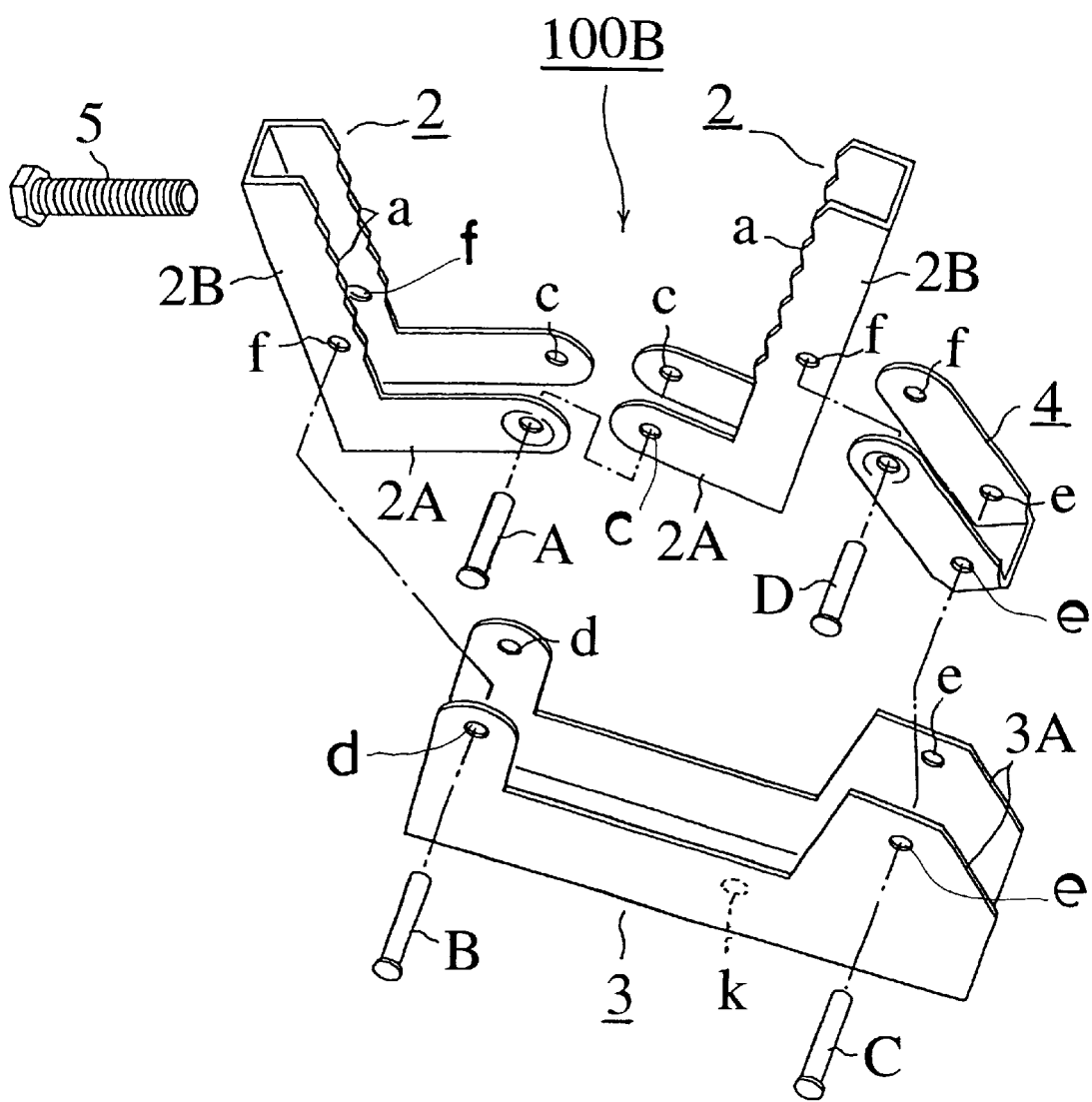
FIG. 13 is an exploded view of the clamp 100B of FIG. 12.
Figure 14:
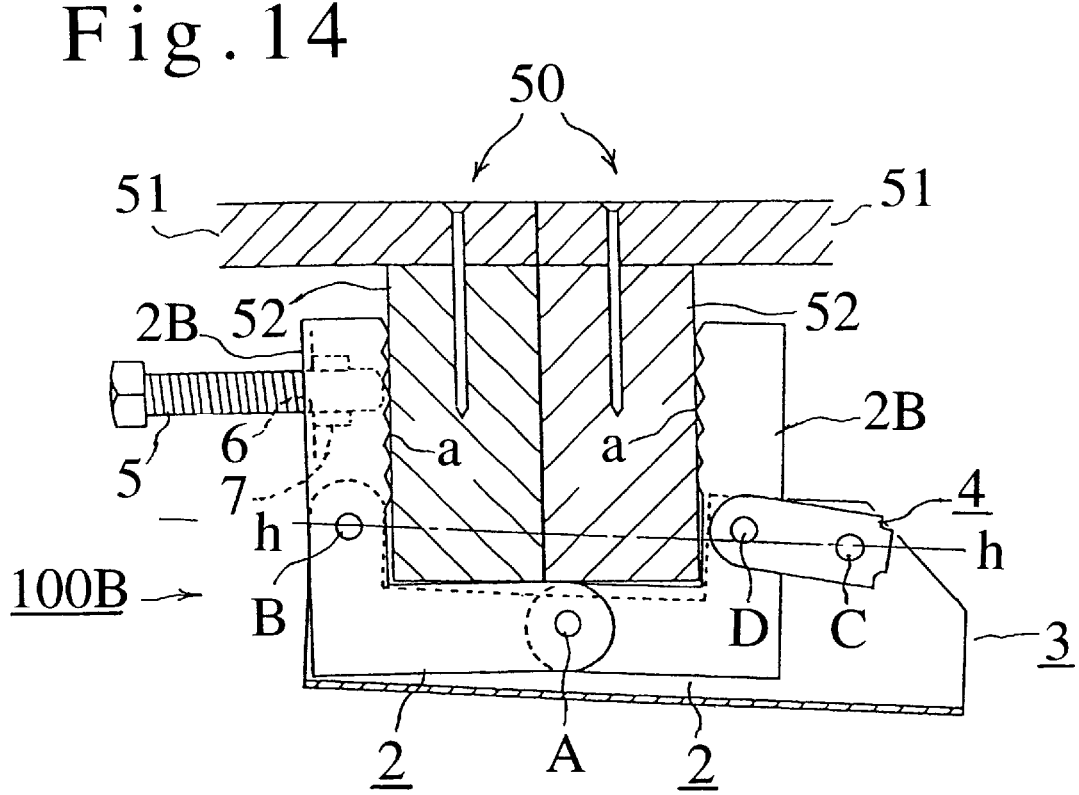
FIGS. 14 and 15 depict two successive points of time. That is.
Figure 15:
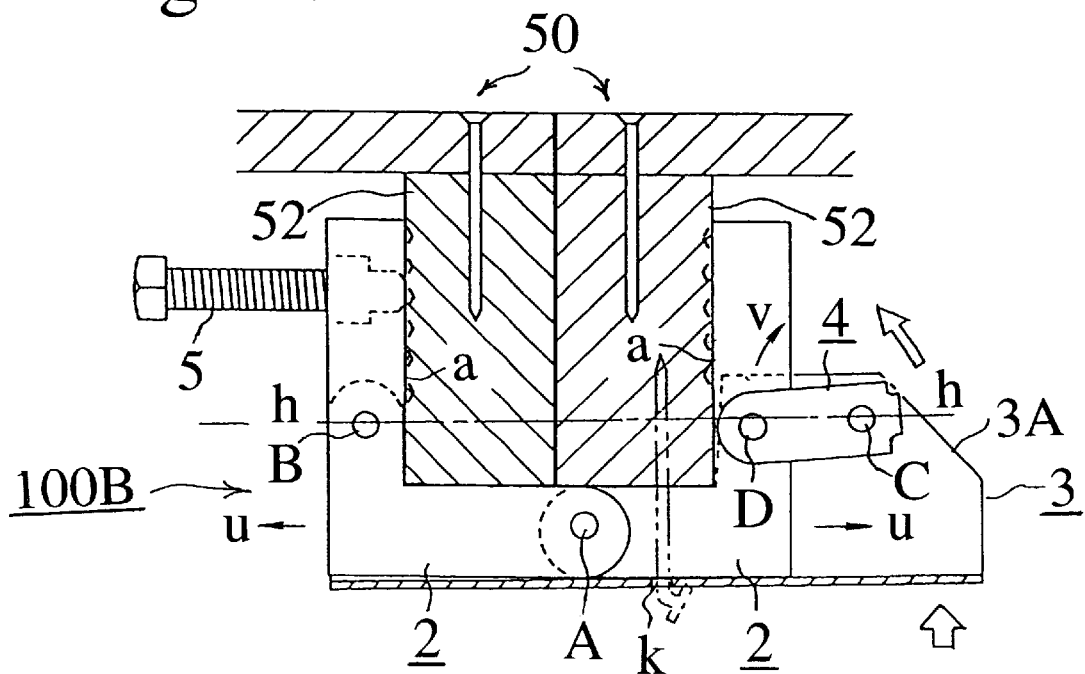

FIGS. 12 to 15 illustrate another clamp 100B of the invention. As shown in FIGS. 14 and 15, this clamp 100 B, unlike the clamp 100A, is used to connect two formwork panels 50, 50 together in the same plane, thereby providing a straight portion of a formwork. The clamp 100B includes a base section 3, a pair of L-shaped holding arms 2, 2, and a link 4. As best shown in FIG. 13, the base section 3 is shaped like a channel in its cross section. The base section 3 has a pair of aligned openings d, d. Another pair of openings e, e are also made in alignment with each other. Also, an opening k is made in the bottom of the base section 3. Also, the base section 3 has inclined portions 3A.

Each L-shaped holding arm 2 includes a longer portion 2B and a shorter portion 2A, although the shorter portion 2A of the left-hand holding arm 2 is longer than the shorter portion 2A of the right-hand holding arm 2. Also, each holding arm 2 has a pair of aligned openings f, f. Another pair of openings c, c are also provided in alignment with each other. The longer portion 2B of each holding arm 2 is provided with two parallel series of notches a at its inner edges. The left-hand holding arm 2 is joined with the base section 3 by means of a pivotal pin B that is inserted through the openings d, d of the base section 3 and the openings f, f of the left-hand holding arm 2. The right-hand holding arm 2 is connected with the left-hand holding arm 2 by means of a pivotal pin A that is inserted through the four openings c of the two holding arms 2, 2. The link 4 has two aligned openings f, f and too aligned openings e, e. The link 4 is joined with the base section 3 by means of a pivotal pin C that is inserted through the openings e, e of the base section 3 and the openings e, e of the link 4. Also, the link 4 is connected with the right-hand holding arm 2 by means of a pivotal pin D that is inserted through the four openings f of the link 4 and right-hand holding arm 2. The base section 3, two holding arms 2, 2 and link 4 are thus united as one body.

As shown in FIG. 14, an opening 6 is made in the left-hand holding arm 2, and a bolt 5 is inserted through the opening 6. Reference numeral 7 of FIG. 14 designates a nut that is in engagement with the bolt 15.

Two formwork panels to provide a straight portion of a formwork are positioned as shown in FIG. 14. Then, as shown in FIG. 12, the gap between the two holding arms 2, 2 is widened into a shape like that of a wedge. Next, as shown in FIG. 14, the holding arms 2, 2 are made to embrace joint members 52, 52 of the panels 50, 50. Before doing this, however, one has to make the inner end of the bolt 5 project from the left-hand holding arm 2 slightly such that the notches a and a do not bite into the joint members 52, 52 when one embraces the joint members 52, 52 with the holding arms 2, 2.

As shown in FIG. 14, when the joint members 52, 52 have thus been embraced, the pivotal pin D is above a line h—h connecting the pivotal pins B and C. Then as indicated by a thick arrow of FIG. 15, one strikes the bottom of the base section 3 with a hammer or the like. This will further turn the holding arms 2, 2 inwardly on the pivotal pin A, with the result that the notches a and a of the two holding arms 2, 2 bite into the joint members 52, 52, as shown in FIG. 15. At the same time, the pivotal pin D comes below the line h—h (FIG. 15). The two formwork panels 50, 50 are firmly fastened together.

If desired, as shown in FIG. 15, one can drive a nail into the clamp 100B and the right-hand joint member 52 through the opening k of the base section 3 to strengthen the fastening of the panels 50, 50 by the clamp 100B. After use of the panels 50, 50, one can strike the inclined portions 3A of the clamp 100B with a hammer or the like to remove the clamp 100B from the panels.

What is claimed is:

1. A device for removably connecting formwork panels (50, 50) together at an angle somewhere in the vicinity of 90 degrees, each said formwork panel (50) consisting of a wood board (51) and a pair of opposed elongated joint members (52, 52) of wood fixed to an outer surface of said wood board (51) along opposed edges of said wood board (51) and each said joint member (52) making a right angle with said wood board (51), said device having a symmetrical shape and comprising (A) a central section having two sides that extend perpendicular to each other so that each said side is adapted to engage with one side of one joint member (52) of one formwork panel (50),
    each said side having a plurality of first notches adapted to bite into the one side of the one joint member (52) engaged thereby and (B) a pair of mechanisms pivotally connected to said central section and each adapted to engage with a side of the one joint member (52) opposed to the one side adapted to be engaged by said central section,
    each said mechanism having a plurality of second notches adapted to bite into the opposed side of the one joint member (52) engaged thereby,
    each said mechanism also having an additional engaging adapted means for engaging with the opposed side of the one joint member (52) engaged thereby.

2. A device in accordance with claim 1 for removably connecting formwork panels (50, 50) together at an angle of ninety degrees.

3. A device in accordance with claim 1 wherein each said mechanism pivotally connected to said central section comprises (i) an intermediate lever (3) and (ii) a holding arm (2) pivotally connected to the intermediate lever (3), the intermediate lever (3) and the holding arm (2) being also pivotally connected to said central section, and said second notches and said additional engaging means being part of the holding arm (2).

4. A device in accordance with claim 3 wherein said holding arm (2) can be partially disposed into said intermediate lever (3).

5. A device in accordance with claim 1 wherein said additional engaging means comprises a bolt (5).

6. A device in accordance with claim 1 wherein each of said pair of mechanisms is pivotably connected to said central section for pivoting about a pivot point therein.

7. A device in accordance with claim 6 wherein said two sides of said central section extend from a point of intersection of two perpendicular directions at a small side of said central section to a large side of said central section, and said pivot points for said pair of mechanisms are located at the large side of said central section.

8. A device in accordance with claim 3 wherein said central section has a shape substantially corresponding to a right triangle, said right triangle having two substantially perpendicular arms defined by said two sides of said central section and a further side connected to said two sides and substantially forming a hypotenuse of the right triangle.

9. A device in accordance with claim 8, wherein said pair of mechanisms are pivotally connected to said central section at pivot points located at said further side forming said hypotenuse of said right triangle.

10. A device for removably connecting formwork panels (50, 50) together at a right angle, said formwork panels each having a pair of opposed elongated joint members (52, 52) of wood fixed to an outer surface of a square wood board (51) along opposed edges of the wood board and each said joint member (52) being fixed to said square wood board (51) at a right angle, said device having a symmetrical shape and comprising:

(A) a central section (1) having a channel shaped cross section and including two parallel wall members (1a, 1a) each shaped generally into an isosceles triangle and having two equal sides (a, a) which extend perpendicular to each other and at which said wall members (1a, 1a) are adapted to engage with the joint members (52, 52) of the formwork panels (50, 50) to hold those joint members (52, 52), a group of successive notches (1c) being formed on one of said two equal sides (a, a) and another group of successive notches (1c) being formed on the other of said two equal sides (a, a), a central recess (1d) being provided between the two groups of successive notches (1c, 1c), said groups of successive notches (1c, 1c) adapted to bite into said joint members (52, 52) of the formwork panels, so that said two equal sides (a, a) of each said wall member (1a) is capable of engaging very closely with the joint members (52, 52) of the formwork panels (50, 50), and each said wall member (1a) also having two outer openings (c, c), as well as two inner openings (d, d), (B) two intermediate levers (3, 3) connected to said central section (1) on opposed sides of said central section (1) by pivotal pins (B, B), each said intermediate lever (3) having a channel shaped cross section and having opposed side walls (3a, 3a), said side walls (3a, 3a) being spaced apart from each other at a distance permitting said side walls (3a, 3a) to slide on an outside of said central section (1), said side walls (3a, 3a) having respective openings (e, e) in alignment with each other and two other openings in alignment with each other, each said pivotal pin (B) being inserted through one of said two inner openings (d, d) of each said wall member (1a) of said central section (1) and a corresponding respective other opening of said side walls (3a, 3a), each said side wall (3a) being recessed at a central portion thereof (3b) and adapted to accommodate and hold one joint member (52) of one formwork panel (50), and each said side wall (3a) being also recessed at another central portion (3c) in a vertical direction thereof permitting said side walls (3a, 3a) to engage frictionally with an L-shaped holding arm (2), (C) a respective L-shaped holding arm (2) connected to each of the opposed sides of said central section (1) by a pivotal pin (A), said respective L-shaped holding arm (2) being also connected to a respective one of said intermediate levers (3, 3) by means of a link (4), each said holding arm (2) having a pair of aligned openings in one straight portion (2A) thereof and having another pair of aligned openings (f, f) in another straight portion (2B) thereof that is perpendicular to said one straight portion (2A), said pivotal pin (A) being inserted through said aligned openings in said one straight portion (2A) and one of said two outer openings (c, c) of each said wall member (1a) of said central section (1), another pivotal pin (D) being inserted through said aligned openings (f, f) in said another straight portion (2B) and two corresponding aligned openings in said link (4), said another straight portion (2B) having inner edges (b, b) adapted to engage with one joint member (52) of the formwork panel (50) on a side opposed to a side where one of said equal sides (a, a) of each said wall member (1a) of said central section (1) is adapted to engage with the same one joint member (52), a group of successive notches (2c) being formed on one of said inner edges (b, b) and another group of successive notches (2c) being formed on the other of said inner edges (b, b), said groups of successive notches (2c, 2c) adapted to bite into the joint member (52), permitting said another straight portion (2B) of said holding arm (2) to engage very closely with the joint member (52) so that said holding arm (2) is able to hold the joint member (52) very firmly, and (D) said link (4) also having two aligned openings another pivotal pin (C) being inserted through said two aligned openings of said link (4) and said respective openings (e, e) of said side walls (3a, 3a) of said intermediate lever (3), thereby connecting together said intermediate lever (3) and said link (4).

11. A device for removably connecting formwork panels (50, 50) together in one plane in order to provide a straight portion of a formwork, said formwork panels each having a pair of opposed elongated joint members (52, 52) of wood fixed to an outer surface of a square wood board (51) along opposed edges of the wood board, said device comprising:

(i) a base section (3) having a channel shaped cross section and having a first pair of two aligned openings (d, d) and a second pair of two aligned openings (e, e) and said base section (3) also having parallel inclined portions (3A, 3A), (ii) first and second L-shaped holding arms (2, 2) having a space between them adapted for holding joint members (52, 52) of formwork panels (50, 50), each said holding arm (2) having a first straight portion (2A) and a second straight portion (2B) that is perpendicular to said first straight portion (2A), said first straight portion (2A) having two aligned openings (c, c) and said second straight portion (2B) having two aligned openings (f, f), said second straight portion (2B) also having two parallel series of notches (a) on its inner edges, said notches (a) being adapted to bite into the joint members (52, 52) to permit said inner edges of said second straight portion (2B) to engage very closely with the joint members (52, 52), thus holding the joint members (52, 52) very firmly, said first holding arm (2) joined with said base section (3) by a pivotal pin (B) inserted through said openings (d, d) of said base section (3) and said openings (f, f) of said second straight portion (2B) of said first holding arm (2), and said second holding arm (2) connected with said first holding arm (2) by a pivotal pin (A) inserted through said openings (c, c) of said first straight portion (2A) of each said holding arm (2), (iii) a link (4) having first and second pairs of aligned openings, said link (4) joined with said base section (3) by a pivotal pin (C) inserted through said first pair of aligned openings of said link (4) and said two aligned openings (e, e) of said base section (3), and said link (4) connected with said second holding arm (2) by a pivotal pin (D) inserted through said second pair of aligned openings of said link (4) and said two aligned openings (f, f) of said second straight portion (2B) of said second holding arm (2), and (iv) a bolt (5) inserted through an opening (6) of said first holding arm (2), said bolt (5) having an inner end located inside said first holding arm (2), and said inner end of said bolt (5) configured for engaging with a joint member (52) of a formwork panel (50) before said notches (a) of each said holding arm (2) are able to bite into the joint members (52, 52).

\* \* \* \* \*